United States Patent
Shastri et al.

[11] Patent Number: 6,128,350
[45] Date of Patent: Oct. 3, 2000

[54] METHOD AND APPARATUS FOR REDUCING PEAK TO AVERAGE POWER RATIO IN DIGITAL BROADCASTING SYSTEMS

[75] Inventors: Anjali Shastri, Clarksville; Brian William Kroeger, Sykesville, both of Md.

[73] Assignee: USA Digital Radio, Inc., Columbia, Md.

[21] Appl. No.: 09/379,780

[22] Filed: Aug. 24, 1999

[51] Int. Cl.[7] .............................. H04K 1/10; H04L 27/28
[52] U.S. Cl. ............................................................ 375/260
[58] Field of Search ..................................... 375/211, 214, 375/260, 296, 345; 455/116, 117

[56] References Cited

U.S. PATENT DOCUMENTS

| | | |
|---|---|---|
| 4,370,622 | 1/1983 | Hornbeck et al. . |
| 5,101,172 | 3/1992 | Ikeda et al. . |
| 5,201,071 | 4/1993 | Webb . |
| 5,300,894 | 4/1994 | Myer et al. . |
| 5,302,914 | 4/1994 | Arntz et al. . |
| 5,349,300 | 9/1994 | Matz et al. . |
| 5,381,449 | 1/1995 | Jasper et al. . |
| 5,450,043 | 9/1995 | Tanaka et al. ............................ 332/103 |
| 5,598,436 | 1/1997 | Drajal et al. . |
| 5,606,578 | 2/1997 | O'Dea . |
| 5,621,762 | 4/1997 | Miller et al. . |
| 5,636,247 | 6/1997 | Kamerman et al. . |
| 5,696,794 | 12/1997 | O'Dea . |
| 5,710,990 | 1/1998 | Long et al. . |
| 5,727,026 | 3/1998 | Beukema . |
| 5,796,784 | 8/1998 | LoGalbo et al. . |
| 5,815,532 | 9/1998 | Bhattacharya et al. . |
| 5,835,536 | 11/1998 | May et al. . |
| 5,838,732 | 11/1998 | Carney . |
| 5,949,796 | 9/1999 | Kumar . |
| 5,970,053 | 10/1999 | Schick et al. ............................ 370/252 |
| 6,038,261 | 3/2000 | Mestdagh ............................ 375/285 |
| 6,049,707 | 4/2000 | Buer et al. ............................ 455/314 |

Primary Examiner—Don N. Vo
Assistant Examiner—Phuong Phu
Attorney, Agent, or Firm—Robert P. Lenart; Eckert Seamans Cherin & Mellott, LLC

[57] ABSTRACT

This invention provides a method for reducing peak to average power ratio in a radio frequency signal. The method comprises the steps of modulating a plurality of sub-carriers with a plurality of data symbol vectors to produce a first modulated signal; limiting the magnitude of the first modulated signal to produce a first limited modulated signal; demodulating the first limited modulated signal to recover the constellation points; predistorting the data symbol vectors to provide a minimum magnitude for in-phase and quadrature components thereof to produce predistorted data symbol vectors; modulating the plurality of carriers with the predistorted data symbol vectors to produce a second modulated signal; limiting the magnitude the second modulated signal to produce a second limited modulated signal; and reducing intermodulation products in the second limited modulated signal. Transmitters that perform the method are also included.

28 Claims, 9 Drawing Sheets

METHOD AND APPARATUS FOR REDUCING PEAK TO AVERAGE POWER RATIO IN DIGITAL BROADCASTING SYSTEMS

BACKGROUND OF THE INVENTION

This invention relates to electronic signal processing, and more particularly, to signal processing directed to reducing peak to average power ratio in radio frequency signals.

Digital Audio Broadcasting (DAB) is a medium for providing digital-quality audio, superior to existing analog broadcasting formats. FM In-Band On-Channel (IBOC) DAB can be transmitted in a hybrid format where the digitally modulated signal coexists with the currently broadcast analog FM signal, or in an all-digital format where the analog FM signal has been eliminated. IBOC requires no new spectral allocations because each DAB signal is simultaneously transmitted within the same spectral mask of an existing FM channel allocation. IBOC promotes economy of spectrum while enabling broadcasters to supply digital quality audio to their present base of listeners.

The advantages of digital transmission for audio include better signal quality with less noise and wider dynamic range than with existing FM radio channels. Initially the hybrid format would be adopted allowing the existing receivers to continue to receive the analog FM signal while allowing new IBOC receivers to decode the digital signal. Some time in the future, when IBOC DAB receivers are abundant, broadcasters may elect to transmit the all-digital format. The goal of FM hybrid IBOC DAB is to provide virtual CD-quality stereo digital audio (plus data) while simultaneously transmitting the existing FM signal. The goal of FM all-digital IBOC DAB is to provide virtual CD-quality stereo audio along with a data channel with capacity of up to about 200 kbps, depending upon a particular station's interference environment.

One proposed FM IBOC broadcasting system uses a plurality of orthogonal frequency division multiplexed (OFDM) carriers to transmit a digital signal. An OFDM signal consists of the sum of several carriers modulated at different equally spaced frequencies, which are orthogonal to each other. This ensures that different subcarriers do not interfere with each other. The magnitude of the transmitted signal in such a system occasionally has very high peaks. Thus the linear power amplifiers used in IBOC DAB transmitters need to operate with large power back-offs so that the out-of-band power is below the imposed limits. This results in very expensive and inefficient amplifiers. Hence, there is a need to reduce the Peak to Average power Ratios (PAR) for an OFDM DAB signal.

This invention provides an efficient scheme for reducing the peak to average power ratio of electronic signals using orthogonal frequency division multiplexing, such as may be used in FM IBOC DAB systems.

SUMMARY OF THE INVENTION

This invention provides a method for reducing peak to average power ratio in a radio frequency signal. The method comprises the steps of modulating a plurality of subcarriers with a plurality of data symbol vectors to produce a first modulated signal; limiting the magnitude of the first modulated signal to produce a first limited modulated signal; demodulating the first limited modulated signal to recover the constellation points; predistorting the data symbol vectors to provide a minimum magnitude for in-phase and quadrature components thereof to produce predistorted data symbol vectors; modulating the plurality of carriers with the predistorted data symbol vectors to produce a second modulated signal; limiting the magnitude of the second modulated signal to produce a second limited modulated signal; and reducing intermodulation products in the second limited modulated signal.

An alternative embodiment particularly applicable to an all digital IBOC DAB system additionally predistorts data symbol vectors of the central subcarriers while reducing intermodulation products in the second modulated limited signal.

The invention also encompasses transmitters that perform the above method.

DESCRIPTION OF THE PREFERRED EMBODIMENTS

Figure 1:
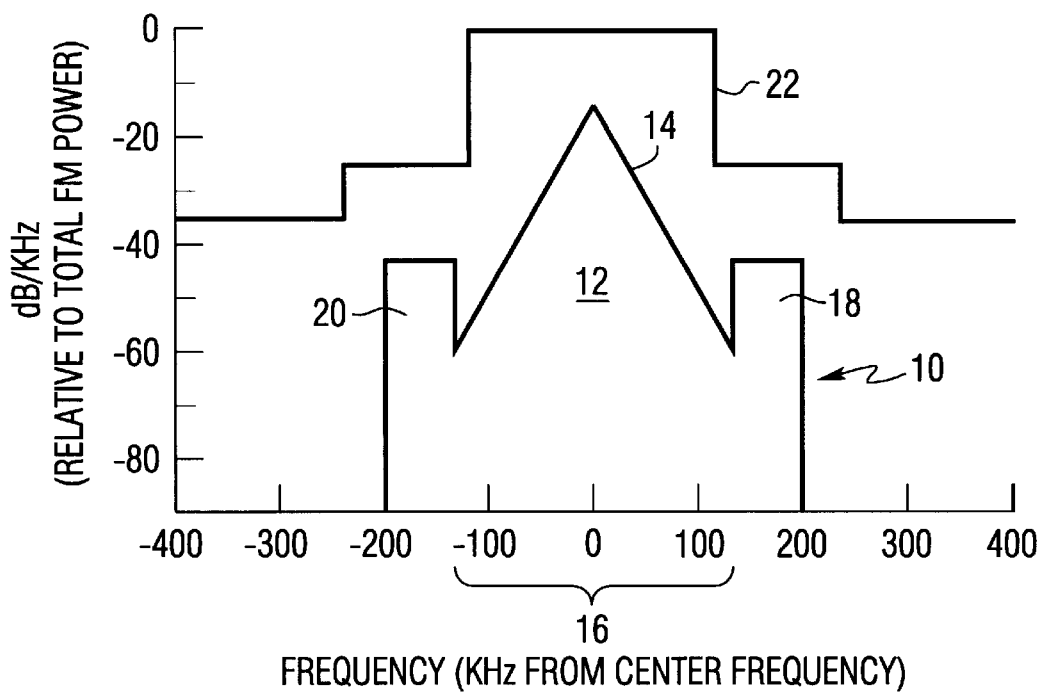
FIG. 1 is a schematic representation of the frequency allocations and relative power spectral density of the signal components for a hybrid FM IBOC DAB signal.

Referring to the drawings, FIG. 1 is a schematic representation of the frequency allocations (spectral placement)

and relative power spectral density of the signal components for a hybrid FM IBOC DAB signal 10 in accordance with the present invention. The hybrid format includes the conventional FM stereo analog signal 12 having a power spectral density represented by the triangular shape 14 positioned in a central frequency band, 16 portion of the channel. The Power Spectral Density (PSD) of a typical analog FM broadcast signal is nearly triangular with a slope of about −0.35 dB/kHz from the center frequency. A plurality of digitally modulated evenly spaced sub-carriers are positioned on either side of the analog FM signal, in an upper sideband 18 and a lower sideband 20, and are transmitted concurrently with the analog FM signal. All of the carriers are transmitted at a power level that falls within the United States Federal Communications Commission channel mask 22. The vertical axis in FIG. 1 shows the peak power spectral density as opposed to a more conventional average power spectral density characterization.

In one proposed modulation format, a plurality of evenly spaced orthogonal frequency division multiplexed (OFDM) sub-carriers are placed on each side of the host analog FM signal occupying the spectrum from about 129 kHz through about 199 kHz away from the host FM center frequency as illustrated by the upper sideband 18 and the lower sideband 20 in FIG. 1. In the hybrid system the total DAB power in the OFDM modulated sub-carriers in each sideband is set to about −25 dB relative to its host analog FM power. The DAB signal is transmitted on the OFDM subcarriers located on either side of the analog spectrum. The DAB system includes of 191 carriers above and 191 carriers below the host FM spectrum. Each DAB subcarrier is QPSK modulated at a symbol rate of 344.53125 Hz. The in-phase and quadrature phase pulse shapes are root raised cosine tapered (excess time=7/128) at the edges to suppress the spectral sidelobes. This pulse shape results in orthogonal subcarrier frequency spacing of 363.3728 Hz.

Figure 2:
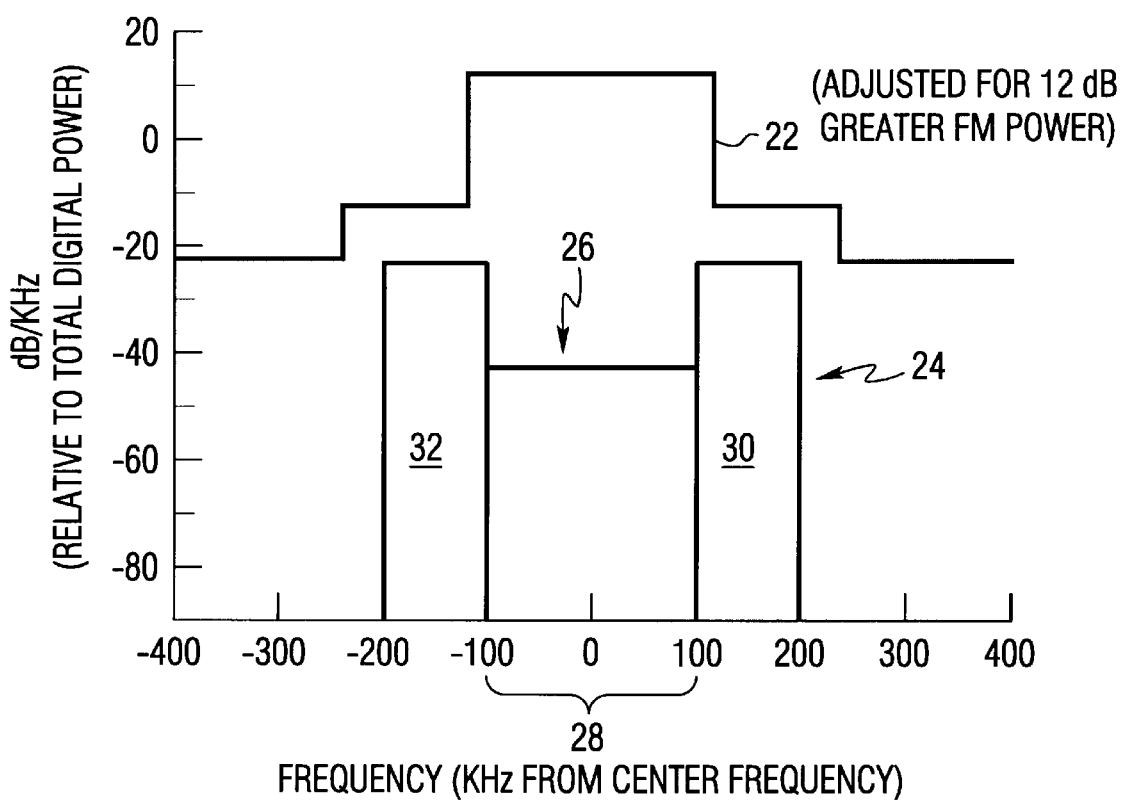
FIG. 2 is a schematic representation of the frequency allocations and relative power spectral density of the signal components for an all-digital FM IBOC DAB signal.

The digitally modulated portion of the hybrid signal is a subset of the all-digital DAB signal that will be transmitted in the all-digital IBOC DAB format. The spectral placement and relative signal power density levels of the OFDM digital sub-carriers in a proposed all-digital FM DAB format illustrated by item number 24, is shown in FIG. 2. The analog FM signal of FIG. 1 has been replaced by an optional additional group of OFDM sub-carriers, referred to as the extended all-digital signal 26, located in the central frequency band 28. Once again evenly spaced OFDM sub-carriers are positions in an upper sideband 30 and a lower sideband 32. The sidebands of the all-digital format of FIG. 2 are wider than the sidebands of FIG. 1. In addition, the power spectral density level of the all-digital IBOC signal sidebands is set about 10 dB higher than that allowed in the hybrid IBOC sidebands. This provides the all-digital IBOC signal with a significant performance advantage. Furthermore the power spectral density of the extended all-digital signal is about 15 dB below that of the hybrid IBOC sidebands. This minimizes or eliminates any interference problems to adjacent hybrid or all-digital IBOC signal while providing additional capacity for other digital services.

The all digital mode is a logical extension of the hybrid mode where the analog signal, which previously occupied the central ±100 kHz region is replaced with low level digital subcarriers. Located on either side of the low-level carriers are two digital sidebands that differ from the hybrid mode by increasing the bandwidth to about 100 kHz and increasing the power by about 10 dB. A proposed all digital DAB system includes 267 carriers in each sideband and 559 carriers in the center. Each DAB subcarrier is QPSK modulated. The in-phase and quadrature phase pulse shapes are root raised cosine tapered (excess time=7/128) at the edges to suppress the spectral sidelobes. This pulse shape results in orthogonal subcarrier frequency spacing of 363.3728 Hz. The power spectral density plots for the transmitted signal should be well within the All-Digital FM IBOC mask.

Figure 3:
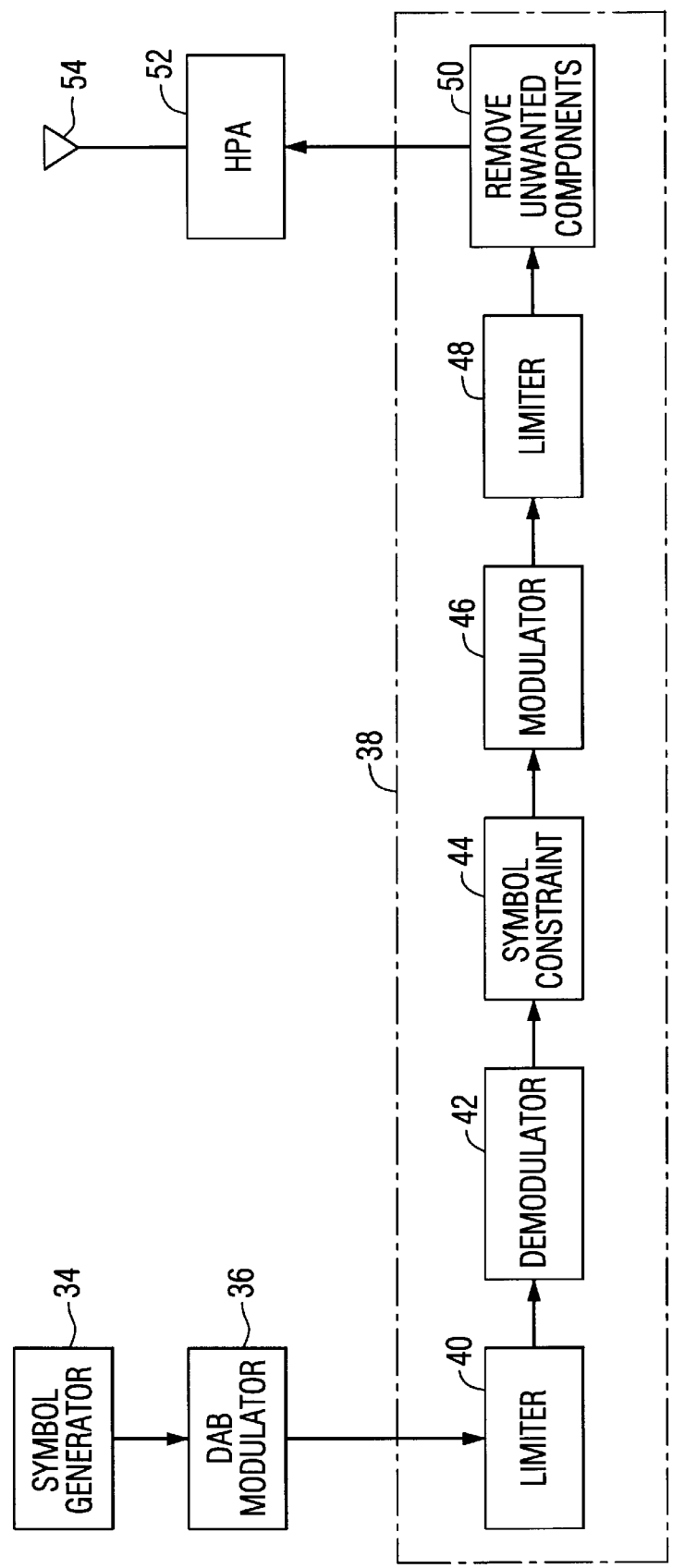
FIG. 3 is a simplified block diagram of a radio transmitter that may incorporate the peak to average power ratio reduction method of the present invention.

FIG. 3 is a functional block diagram illustrating an implementation of the present invention in an IBOC DAB FM transmitter. A symbol generator 34 produces Quadrature Phase Shift Keying (QPSK) data symbols containing the information to be transmitted. These symbols are passed to a modulator 36 wherein a plurality of OFDM subcarriers are modulated to produce the DAB signal (normalized). This modulation includes passing the data symbols through an Inverse Fast Fourier Transform (IFFT) to realize the OFDM modulation. A cyclic prefix, along with a root raised cosine window, is applied to the modulated signal (excess time=7/128). The combination of the IFFT and the windowing operation is referred to henceforth as the DAB modulator.

Block 38 is the main block where the peak to average power ratio reduction is realized. The modulated output of DAB modulator 36 is passed as an input to this block. The output of block 38 is the signal to be transmitted with a reduced PAR. To accomplish the PAR reduction, the modulated signal is limited in amplitude as illustrated by block 40, then it is demodulated as in block 42, and the symbol vectors obtained from the demodulator are predistorted, or constrained, to have a minimum in-phase and quadrature components in block 44. The constrained symbols are then modulated in block 46 to produce a second modulated signal that is subjected to further limiting in block 48. This limiting results in unwanted intermodulation products. The intermodulation products in the limited second modulated signal are then reduced or eliminated in block 50 prior to passing the signal to a high power amplifier 52 for broadcasting via antenna 54.

Figure 4:
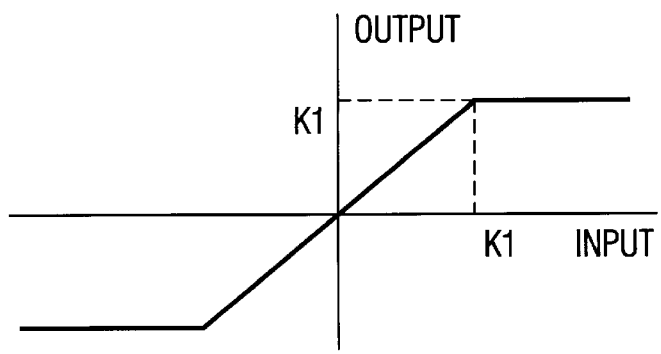
FIG. 4 is a graph illustration one type of limiting that may be employed in the method of this invention.

FIG. 4 is a graph that illustrates the operation of a limiter that may be used to perform the function of block 40. The limiter is set to a certain threshold, or limit value, K1. At any instant in time if the input signal power exceeds K1 it is clipped to K1. Since the input signal is normalized, this ensures that the PAR of signal at the output of the limiter is K1. Thus the operation of the limiter (for real x) can be illustrated as follows. If the value of the input signal (X) is less than −K1, then the output of the limiter is set equal to −K1; if the value of the input signal (X) is greater than K1, then the output of the limiter is set equal to K1; and if the input signal is between −K1 and K1, then the output signal is equal to the input signal. A K1 of 1.58 implies that the peak to average is set to 4 dB for this operation.

The limited modulated signal is then passed to a DAB demodulator 42. In the DAB demodulator, an inverse cyclic prefix and windowing operation is first performed on the modulated samples. This is followed by the Fast Fourier Transform(FFT) to realize OFDM demodulation. The combination of the windowing and FFT is referred to henceforth as the DAB demodulator.

Figure 5:
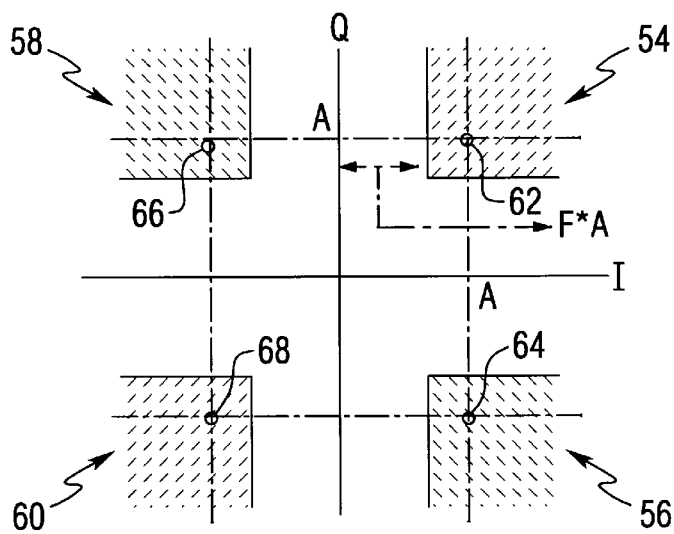
FIG. 5 is a schematic representation of the predistortion of the data symbols as applied in the invention.

Next the data symbol vector constellation points recovered in the demodulation step are constrained to have a minimum in-phase and quadrature components in order to reduce the distortion introduced due to clipping in the limiter. The achieve this constraint, each OFDM symbol vector is in this step forced to lie in a certain region 54, 56, 58 or 60, as depicted in FIG. 5, around the constellation point. In FIG. 5, constellation points 62, 64, 66 and 68 have an expected in-phase and quadrature magnitude of "A".

Some predetermined fraction of "A", designated as "F", defines the region to which the data symbols are constrained. Thus the operation of constraining each element of the OFDM symbol vector is illustrated as follows.

If the input symbol (x) is: x=a+b*i, where "a" is the in-phase component, and "b" is the quadrature component, then the output (y) is defined as: y=a'+b'*i, where a' and b' are defined as follows:

```
If abs(a) <= F * A
    if a < 0,      a' = -(F * A)
    else,          a' = F * A
else a' = a
If abs(b) <= F • A
    if b < 0,      b' = -(F * A)
    else,          b' = F * A
else b' = b
```

With this constraint, it can be seen that the in-phase and quadrature components of the symbol constellation points are forced to have at least a minimum magnitude equal to some predetermined fraction of the expected in-phase and quadrature magnitude.

Next, the constrained symbol vector is modulated through the DAB modulator 46 and the modulated output is passed through the limiter 48. Limiter 48 uses a limiting function similar to that of FIG. 4, but having a threshold value of K2. This ensures that the signal at the output of the limiter 48 has a PAR of K2 since the input signal is normalized.

In order to make the transmitted signal lie well within the hybrid FM IBOC mask the signal is cleaned up in block 50 by zeroing out the non-data subcarriers. The distortion introduced due to this cleaning up operation is minimal. In the preferred embodiment of a FM IBOC DAB system, the actual process involves clipping the non-data subcarriers for all the inactive channels (outside the two sidelobes) to zero.

Figure 6:
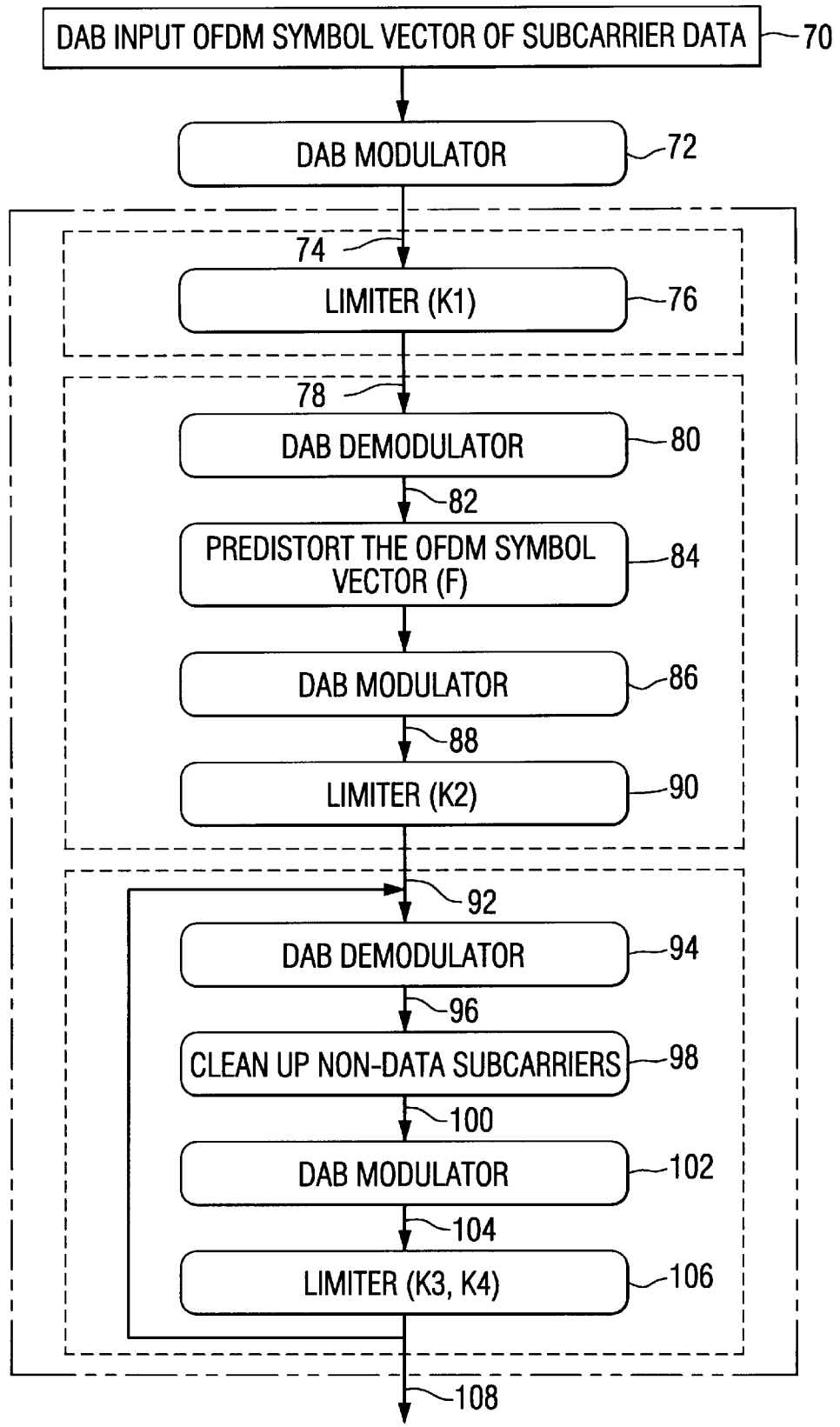
FIG. 6 is a flow chart of the method of this invention as applied to a hybrid digital audio broadcasting system.

FIG. 6 is a flow chart that illustrates the PAR reduction method of the invention. Block 70 shows that the DAB input OFDM symbol vector of subcarrier data is input to DAB modulator 72. The resulting first modulated signal on line 74 is limited in block 76 using a first threshold K1. This produces a limited first modulated signal on line 78 that is subsequently demodulated in block 80 to recover the constellation points of the data symbol vectors on line 82. The recovered constellation points are predistorted in block 84 so that they are constrained to have a predetermined minimum magnitude in-phase and quadrature components as discussed above. DAB modulator 86 modulates the constrained symbol vectors to produce a second modulated signal on line 88. This second modulated signal is limited in limiter 90 having a second threshold K2.

Since the limiting operation produces intermodulation products, these are reduced in the following steps. The second limited modulated signal on line 92 is passed to a demodulator in block 94. The demodulated output on line 96 is passed to a clean-up step in block 98 where the non-data subcarriers are clipped to zero. The resulting signal on line 100 is modulated in block 102 and the third modulated signal on line 104 is limited in block 106 using another limit threshold (K3). In the preferred embodiment of the invention, the steps in blocks 94, 98, 102 and 106 are repeated two times, using threshold value K4 in limiter 106 in the first repetition. In the second repetition, limiter 106 is not used, but the signal is passed on line 108 to a high power amplifier for broadcast.

Figure 7:
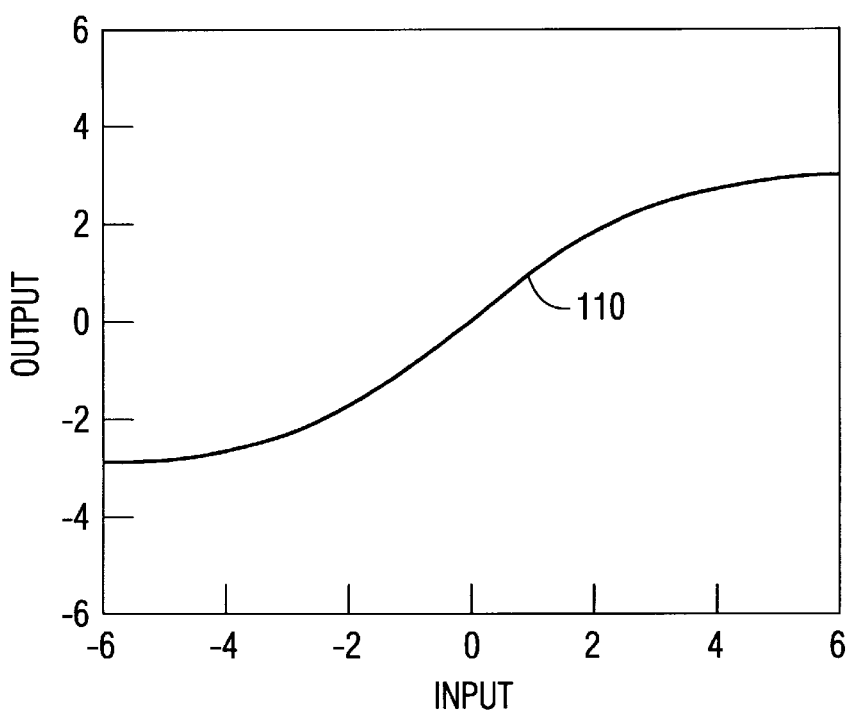
FIG. 7 is a graph illustration another type of limiting that may be employed in the method of this invention.

For simulation purposes two models were used for the HPA. Model 1 uses a "Z curve" limit function as described in FIG. 4. The limiter is set to a certain threshold K5. At any instant in time if the signal power exceeds K5 (for a normalized input signal) it is clipped to K5. Model 2 uses an "S curve" limit function. In this case a scaled error function 110 is used to model the HPA (as illustrated in FIG. 7). The operating point is set by K5. A K5 of 6 dB implies that the signal rms is 6 dB below the 1 dB compression point.

Figure 8:
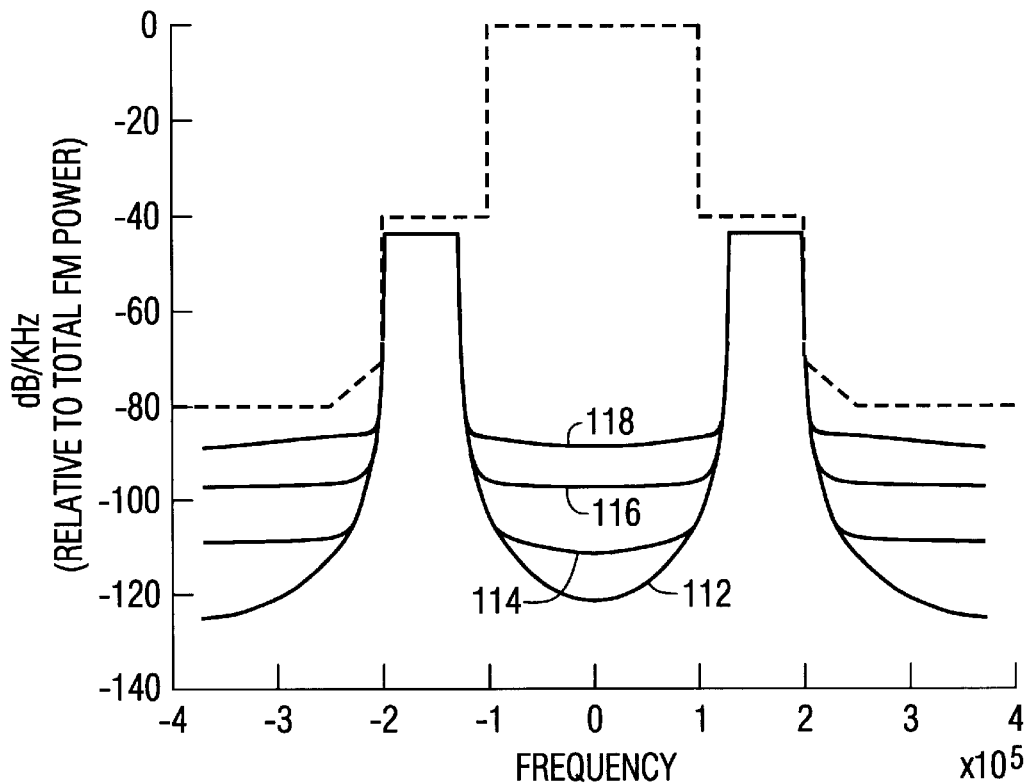
FIG. 8 is a graph of the results of a simulation of the power spectral densities of a modulated waveform processed according to the invention, using the limiting function of FIG. 4.
Figure 9:
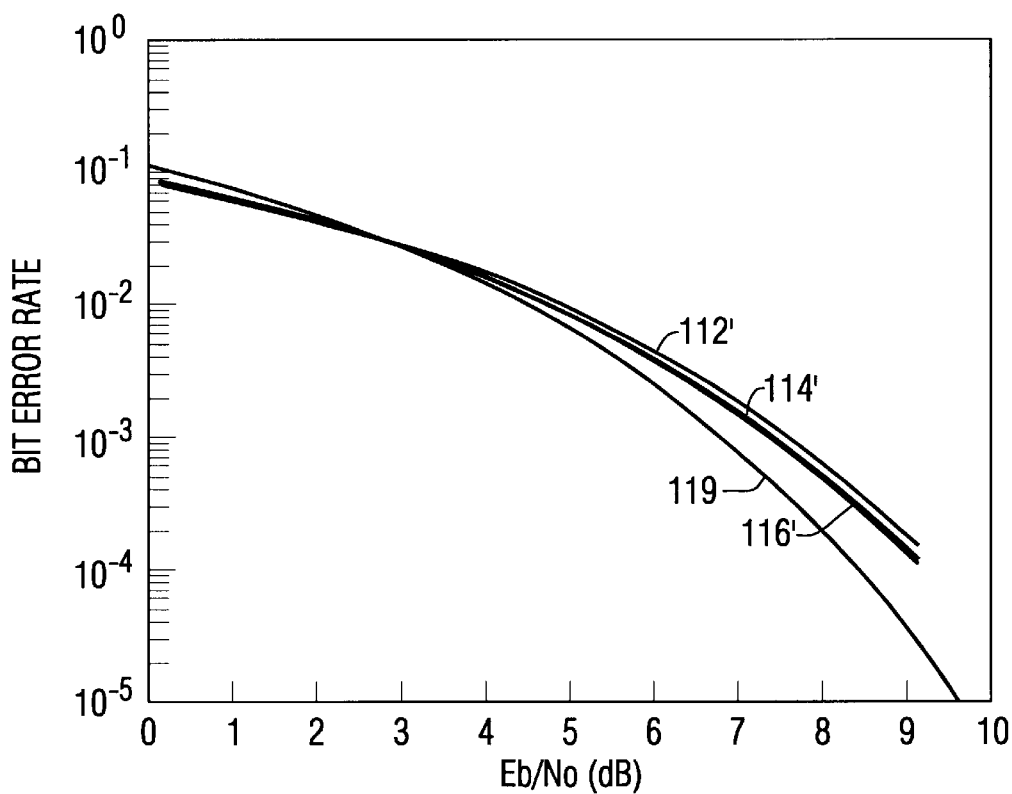
FIG. 9 shows the bit error rates for the various scenarios illustrated in FIG. 8.

FIG. 8 is a graph showing the simulated results of the power spectral densities of the OFDM subcarriers in a sample digital audio broadcast signal using limit value of: K1=3; K2, K3 and K4=4; and fraction F=7/8, using the limiter of FIG. 4, with various final clipping criteria. The signal illustrated by line 112 represents clipping at 5.5+0.85 dB. Line 114 shows clipping at 5.0+0.85 dB, line 116 shows clipping at 4.5+0.86 dB, and line 118 shows the results for clipping at 4.0+0.88 dB. FIG. 9 shows the corresponding bit error rates for these scenarios, using primed numbers for corresponding results. Line 119 represents the unclipped results.

Figure 10:
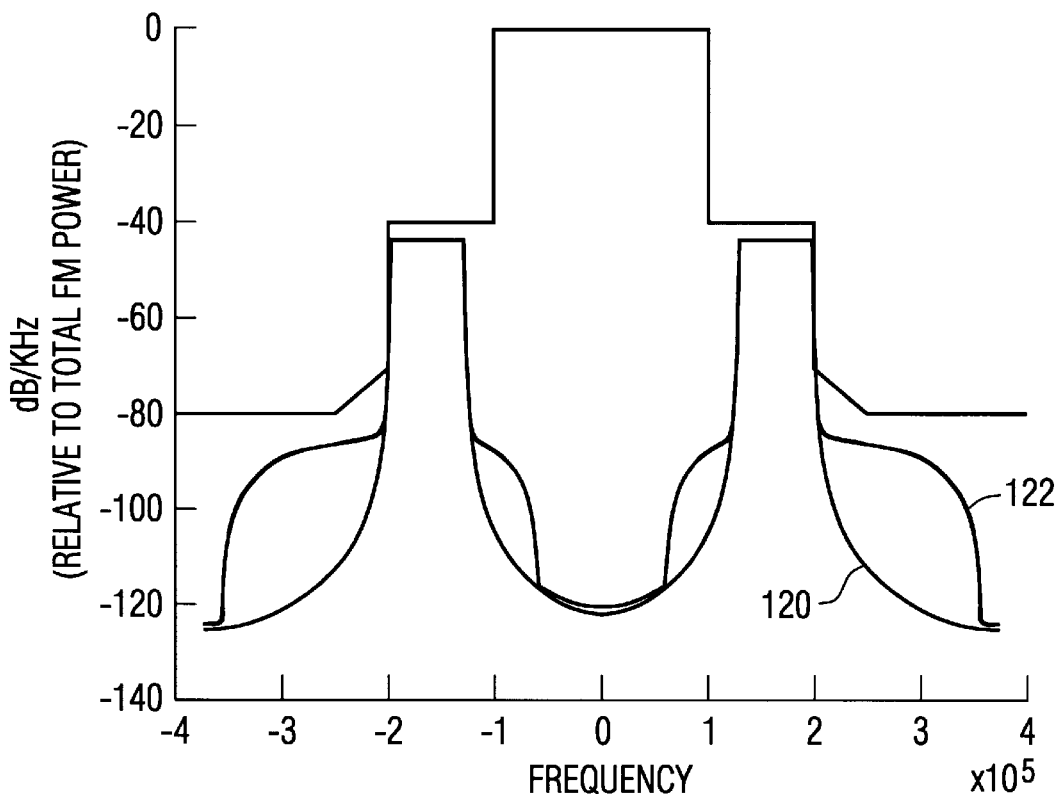
FIG. 10 is a graph of the results of a simulation of the power spectral densities of a modulated waveform processed according to the invention, assuming a high power amplifier using the limiting function of FIG. 7.
Figure 11:
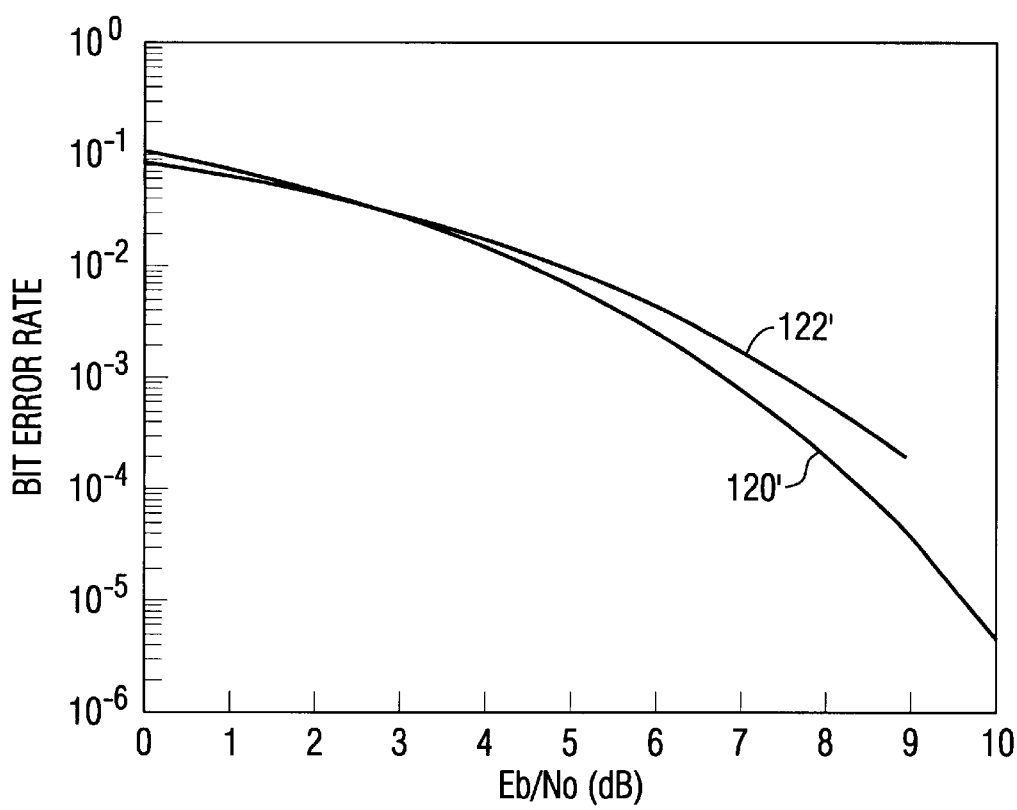
FIG. 11 shows the bit error rates for the various scenarios illustrated in FIG. 10.

FIG. 10 is a graph showing the simulated results of the power spectral densities of the OFDM subcarriers in a sample digital audio broadcast signal using limit value of: K1=3; K2, K3 and K4=4; and fraction F=7/8, using the limiter of FIG. 4 in the PAR reduction method and using the limiter of FIG. 7 for a high power amplifier in the output of the transmitter. The unclipped signal is illustrated by line 120. Line 122 shows clipping at 5.17+1.09 $sig_{rms}$=−8. FIG. 11 shows the corresponding bit error rates for these scenarios, using primed numbers for corresponding results.

Figure 12:
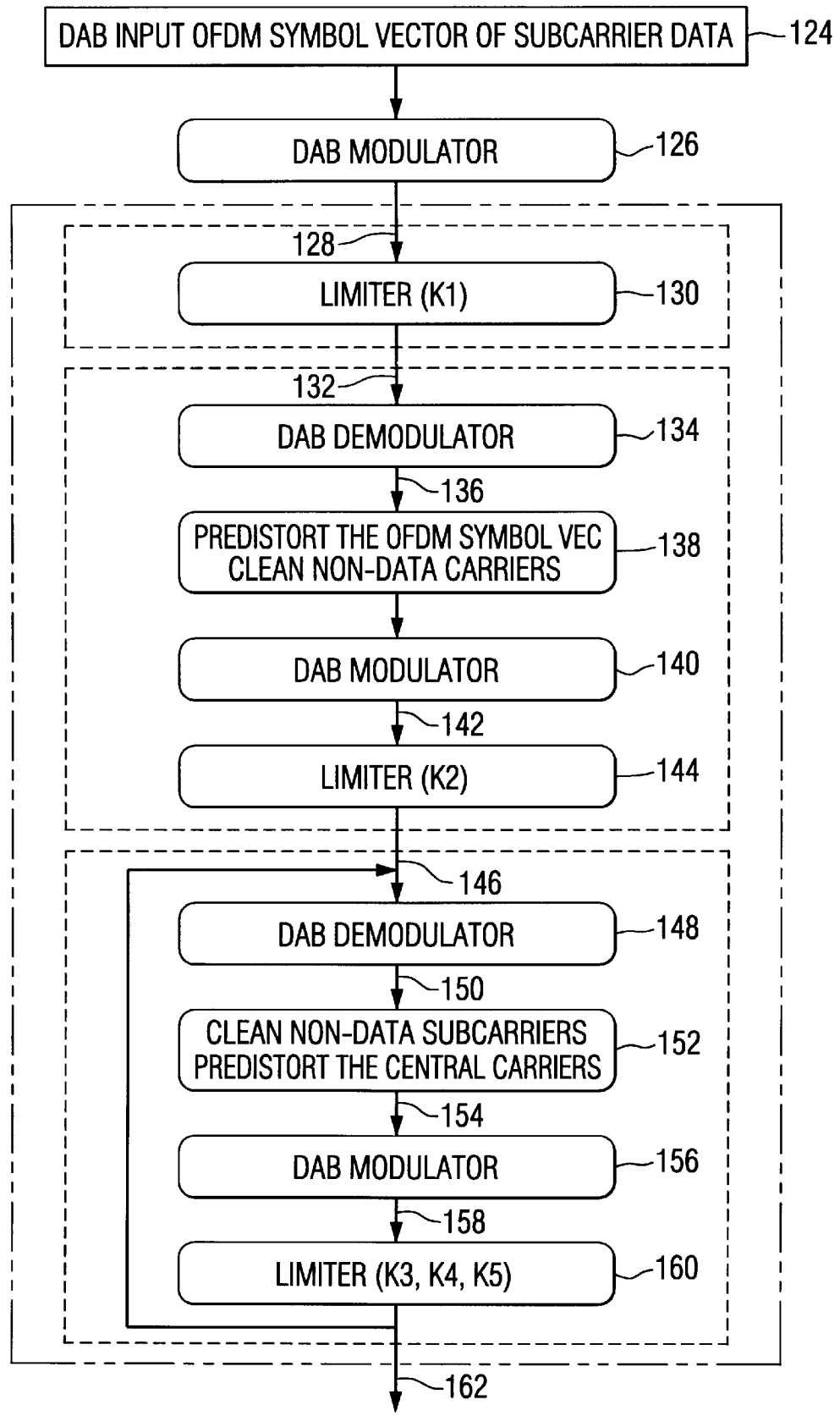
FIG. 12 is a flow chart of the method of this invention as applied to an all digital audio broadcasting transmitter.

FIG. 12 is a flow chart that illustrates the PAR reduction method of the invention for an all-digital signal. Block 124 shows that the DAB input OFDM symbol vector of subcarrier data is input to DAB modulator 126. The resulting first modulated signal on line 128 is limited in block 130 using a first threshold K1. This produces a limited first modulated signal on line 132 that is subsequently demodulated in block 134 to recover the constellation points of the data symbol vectors on line 136. The recovered constellation points are predistorted in block 138 so that they are constrained to have a predetermined minimum magnitude in-phase and quadrature components as discussed above. In addition, unwanted non-data subcarriers are also clipped to zero in this step. DAB modulator 140 modulates the constrained symbol vectors to produce a second modulated signal on line 142. This second modulated signal is limited in limiter 144 having a second threshold K2.

Since the limiting operation produces intermodulation products, these are reduced in the following steps. The second limited modulated signal on line 146 is passed to a demodulator in block 148. The demodulated output on line 150 is passed to block 152 where data symbols from the central carriers are predistorted and the non-data subcarriers are clipped to zero. The resulting signal on line 154 is modulated in block 156 and the third modulated signal on line 158 is limited in block 160 using another limit threshold (K3). In the preferred embodiment of the invention, the steps in blocks 148, 152, 156 and 160 are repeated two times, using threshold value K4 in limiter 160 in the first repetition. In the second repetition, limiter 160 is not used, but the signal is passed on line 162 to a high power amplifier for broadcast.

Figure 13:
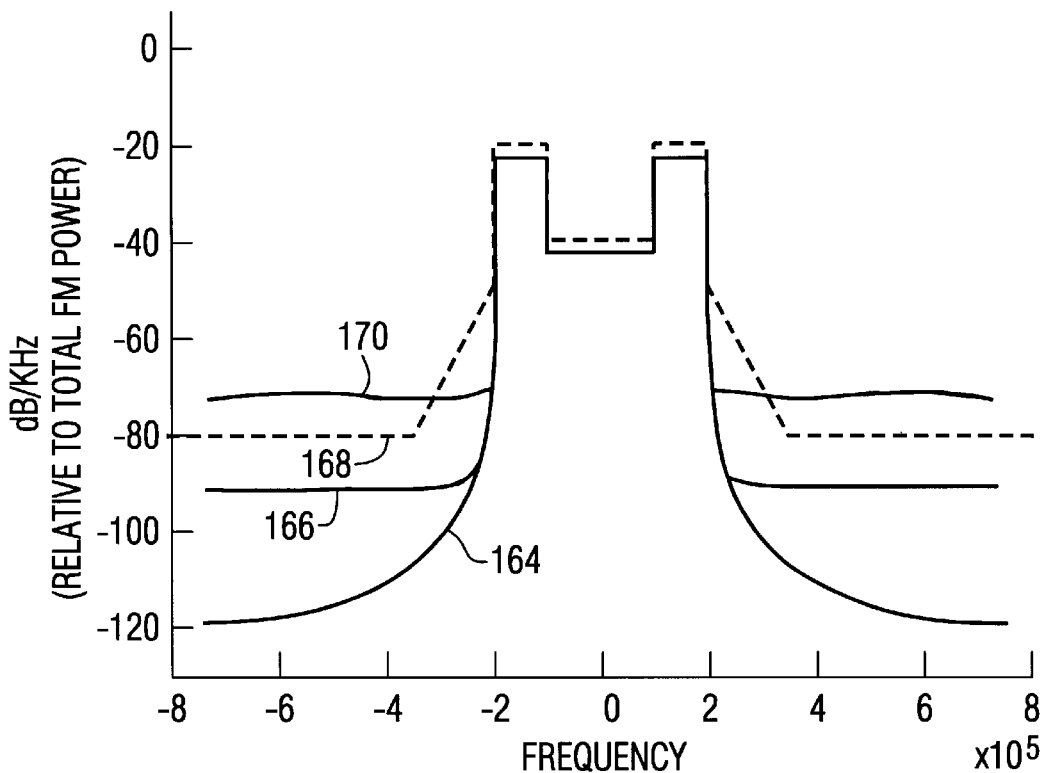
FIG. 13 is a graph of the results of a simulation of the power spectral densities of a modulated waveform processed according to the invention, using the limiting function of FIG. 4.
Figure 14:
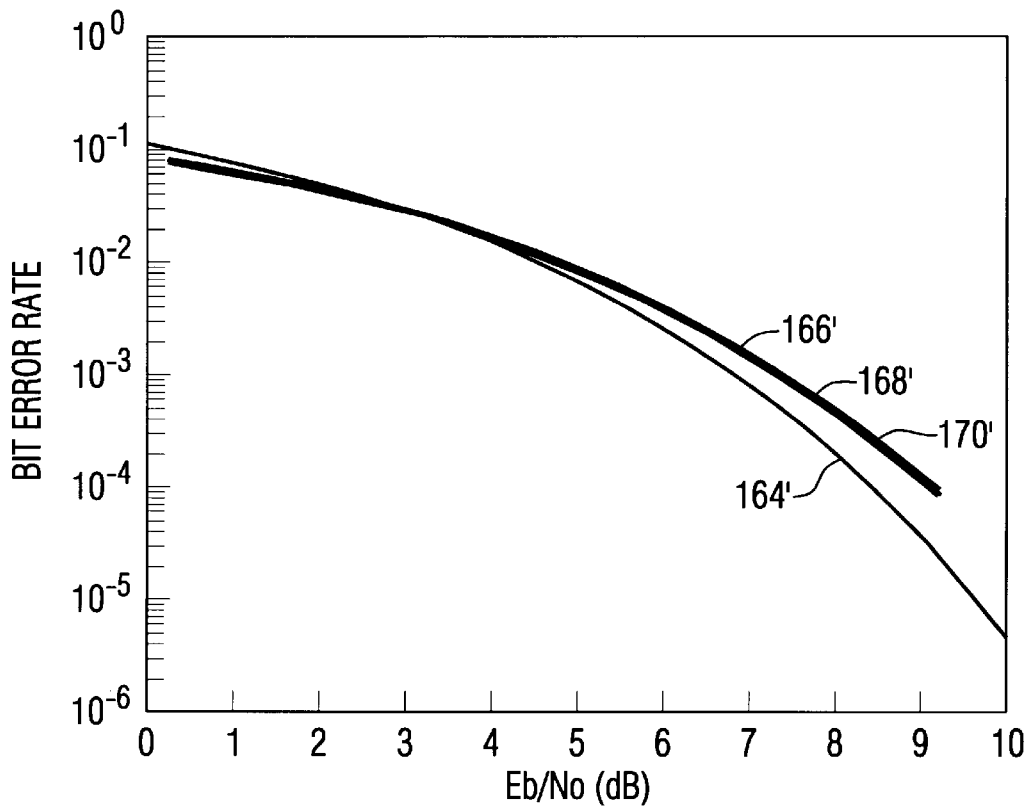
FIG. 14 shows the bit error rates for the various scenarios illustrated in FIG. 13.

FIG. 13 is a graph showing the simulated results of the power spectral densities of the OFDM subcarriers in a sample digital audio broadcast signal using limit value of: K1=3; K2, K3 and K4=4; and fraction F=7/8, using the limiter of FIG. 4, with various final clipping criteria. The unclipped signal is illustrated by line 164. Line 166 shows clipping at 4.5+0.78 dB, line 168 shows clipping at 5.0+0.77 dB, and line 170 shows the results for clipping at 5.5+0.77 dB. FIG. 14 shows the corresponding bit error rates for these scenarios, using primed numbers for corresponding results.

Figure 15:
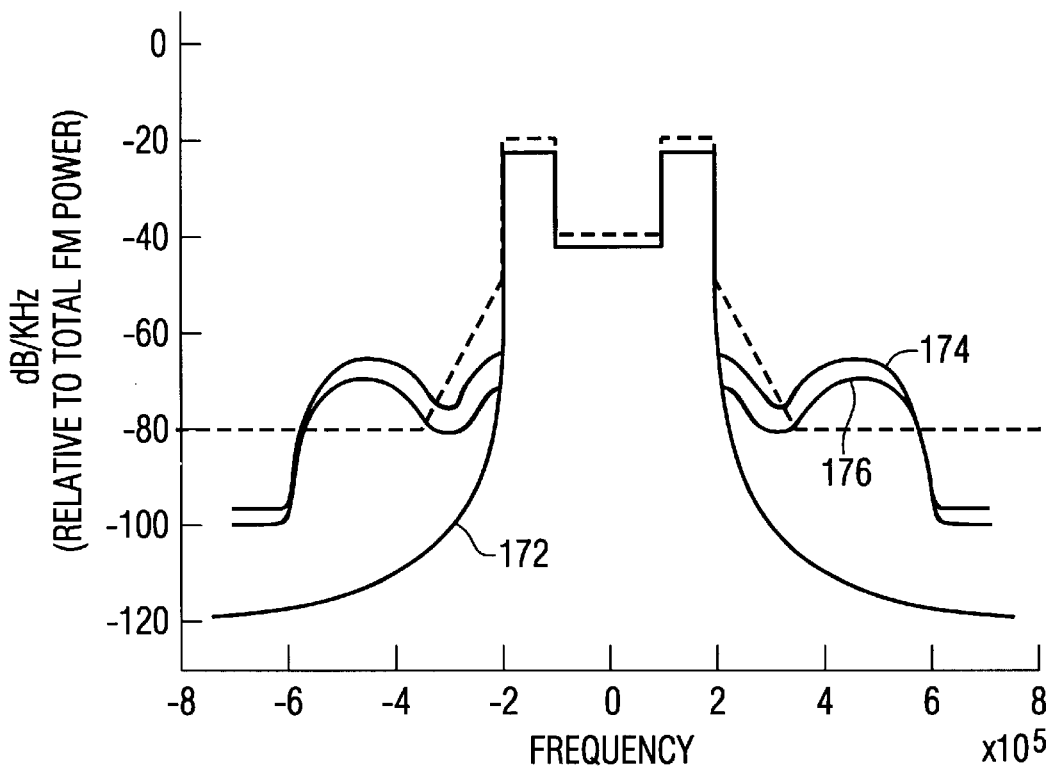
FIG. 15 is a graph of the results of a simulation of the power spectral densities of a modulated waveform processed according to the invention, assuming a high power amplifier using the limiting function of FIG. 7.
Figure 16:
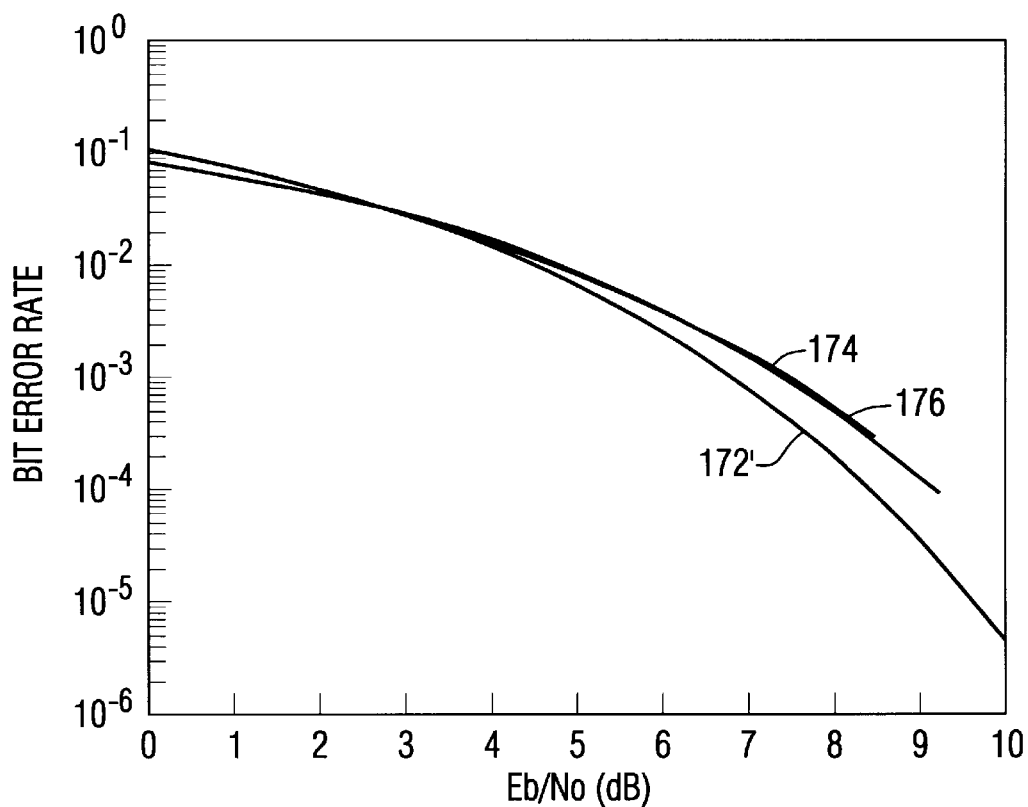
FIG. 16 shows the bit error rates for the various scenarios illustrated in FIG. 15.

FIG. 15 is a graph showing the simulated results of the power spectral densities of the OFDM subcarriers in a sample digital audio broadcast signal using limit value of: K1=3; K2, K3 and K4=4; and fraction F=7/8, using the limiter of FIG. 4 in the PAR reduction method and using the limiter of FIG. 7 for a high power amplifier in the output of the transmitter. The unclipped signal is illustrated by line 172. Line 174 shows clipping at $sig_{rms}$=6, PAR=6.15+0.95 dB, and line 176 shows clipping at $sig_{rms}$=8, PAR=6.38+ 0.88 dB. FIG. 16 shows the corresponding bit error rates for these scenarios, using primed numbers for corresponding results.

All simulations were carried out using 512 OFDM symbols. The optimum parameters chosen were K1=3 dB, K2=4 dB, K3=4 dB, K4=4 dB, F=7/8. The performance measures considered were power spectral density (PSD) and Bit Error Rate (BER). Also, the demodulated signal points were plotted to depict the distortion introduced.

In the last stage the sampling frequency can be doubled by zero padding the signal in frequency domain. To reduce complexity of the PAR reducing scheme, the last step could be done twice instead of three times. There would be a performance loss but the PSDs are still within the Hybrid FM IBOC Mask.

This invention describes a novel approach for Peak to Average Ratio (PAR) reduction in OFDM for FM IBOC DAB systems. Simulation results (using Z and S curves for power amplifier) for this approach show that the invention can achieve a PAR down to 4–7 dB and still be within the FM mask. The distortion introduced due to this predistortion scheme is minimal. In particular by using the parameters K1=3 dB, K2=4 dB, K3=4 dB, K4=4 dB, F=7/8 a very good spectral occupancy plot is achieved for the DAB signal which is well within the FM mask. Also, the distortion introduced with this particular set of values is minimal.

This invention uses a combination of predistortion of the transmit signal along with clipping to minimize the PAR of the transmitted signal. The PAR reductions in the optimized transmit signal have been demonstrated with simulation results. While the present invention has been illustrated in terms of its preferred embodiments, it should be understood that various changes may be made to the disclosed method and system without departing from the scope of the invention which is defined by the following claims, including equivalents thereof. For example, the invention has been illustrated in terms of its application to digital audio broadcasting, but it has more general application to other systems for transmitting digital information by multicarrier modulation.

What is claimed is:

1. A method for reducing peak to average power ratio in a radio frequency signal, the method comprising the steps of:

modulating a plurality of sub-carriers with a plurality of data symbol vectors to produce a first modulated signal;

limiting the magnitude of the first modulated signal to produce a first limited modulated signal;

demodulating the first limited modulated signal to recover the data symbol vectors;

predistorting the data symbol vectors to provide a minimum magnitude for in-phase and quadrature components thereof to produce predistorted data symbol vectors;

modulating the plurality of carriers with the predistorted data symbol vectors to produce a second modulated signal;

limiting the magnitude said second modulated signal to produce a second limited modulated signal; and reducing intermodulation products in said second limited modulated signal.

2. The method of claim 1, wherein said step of reducing intermodulation products in said second limited modulated signal comprises the steps of:

demodulating said second modulated signal to produce a second demodulated signal;

clipping the non-data subcarriers to zero in said second demodulated signal; and modulating said second demodulated signal to produce a third modulated signal.

3. The method of claim 2, further comprising the step of: limiting said third modulated signal.

4. The method of claim 3, further comprising the step of:

demodulating said third modulated signal to produce a third demodulated signal;

clipping the non-data subcarriers to zero in said third demodulated signal; and modulating said third demodulated signal to produce a fourth modulated signal.

5. The method of claim 4, further comprising the step of: limiting said fourth modulated signal.

6. The method of claim 5, further comprising the step of:

demodulating said fourth modulated signal to produce a fourth demodulated signal;

clipping the non-data subcarriers to zero in said fourth demodulated signal; and modulating said fourth demodulated signal to produce a fifth modulated signal.

7. The method of claim 1, wherein said data symbol vectors include a plurality of constellation points representative of data symbols, said constellation points having an in-phase component and a quadrature component, and said predistorting step comprises the steps of:

scaling said in-phase component of each constellation point to have a magnitude greater than or equal to a first predetermined magnitude;

scaling said quadrature component of each constellation point to have a magnitude greater than or equal to a second predetermined magnitude.

8. The method of claim 1, wherein said step of modulating a plurality of sub-carriers with a plurality of data symbols to produce a modulated signal comprises quadrature phase shift keying modulation.

9. The method of claim 8, wherein said plurality of carriers are orthogonal frequency division multiplexed carriers.

10. The method of claim 1, wherein the step of limiting the magnitude of the first modulated signal to produce a first-limited modulated signal comprises the step of:

setting the maximum magnitude of the first modulated signal to a predetermined constant magnitude.

11. The method of claim 1, wherein the step of limiting the magnitude of the modulated signal to produce a first limited modulated signal comprises the step of:

setting the maximum magnitude of the first modulated signal to a predetermined magnitude defined by a scaled Z curve.

12. The method of claim 1, wherein said modulated carriers are normalized.

13. The method of claim 1, wherein said step of modulating a plurality of sub-carriers with a plurality of data symbol vectors to produce a first modulated signal comprises the steps of:

applying an Inverse Fast Fourier Transform to said data symbol vectors;

applying a cyclic prefix to said data symbol vectors; and applying a root raised cosine window to said data symbol vectors.

14. A method for reducing peak to average power ratio in a radio frequency signal, the method comprising the steps of:

modulating a plurality of sub-carriers with a plurality of data symbol vectors to produce a first modulated signal, a first group of said subcarriers lying in upper and lower sidebands of a radio channel, and a second group of said subcarriers lying in a central band of said radio channel;

limiting the magnitude of the first modulated signal to produce a first limited modulated signal;

removing intermodulation products in said first limited modulated signal;

demodulating the first limited modulated signal to recover the constellation points;

predistorting the data symbol vectors on said first and second group of subcarriers to provide a minimum magnitude for in-phase and quadrature components thereof to produce predistorted data symbol vectors;

modulating the plurality of carriers with the predistorted data symbol vectors to produce a second modulated signal;

limiting the magnitude said second modulated signal to produce a second limited modulated signal;

removing intermodulation products in said second limited modulated signal; and predistorting the data symbol vectors on said second group of subcarriers to provide a minimum magnitude for in-phase and quadrature components thereof to produce additional predistorted data symbol vectors.

15. The method of claim 14, wherein said step of removing intermodulation products in said second limited modulated signal comprises the steps of:

demodulating said second modulated signal to produce a second demodulated signal;

clipping the non-data subcarriers to zero in said second demodulated signal; and modulating said second demodulated signal to produce a third modulated signal.

16. The method of claim 15, further comprising the step of:

limiting said third modulated signal.

17. The method of claim 16, further comprising the step of:

demodulating said third modulated signal to produce a third demodulated signal;

clipping the non-data subcarriers to zero in said third demodulated signal; and modulating said third demodulated signal to produce a fourth modulated signal.

18. The method of claim 17, further comprising the step of:

limiting said fourth modulated signal.

19. The method of claim 18, further comprising the step of:

demodulating said fourth modulated signal to produce a fourth demodulated signal;

clipping the non-data subcarriers to zero in said fourth demodulated signal; and modulating said fourth demodulated signal to produce a fifth modulated signal.

20. The method of claim 14, wherein said data symbol vectors include a plurality of constellation points representative of data symbols, said constellation points having an in-phase component and a quadrature component, and said predistorting step comprises the steps of:

scaling said in-phase component of each constellation point to have a magnitude greater than or equal to a first predetermined magnitude;

scaling said quadrature component of each constellation point to have a magnitude greater than or equal to a second predetermined magnitude.

21. The method of claim 14, wherein said step of modulating a plurality of sub-carriers with a plurality of data symbols to produce a modulated signal comprises quadrature phase shift keying modulation.

22. The method of claim 21, wherein said plurality of carriers are orthogonal frequency division multiplexed carriers.

23. The method of claim 14, wherein the step of limiting the magnitude of the first modulated signal to produce a first limited modulated signal comprises the step of:

setting the maximum magnitude of the first modulated signal to a predetermined constant magnitude.

24. The method of claim 14, wherein the step of limiting the magnitude of the modulated signal to produce a first limited modulated signal comprises the step of:

setting the maximum magnitude of the first modulated signal to a predetermined magnitude defined by a scaled Z curve.

25. The method of claim 14, wherein said modulated carriers are normalized.

26. The method of claim 14, wherein said step of modulating a plurality of sub-carriers with a plurality of data symbol vectors to produce a first modulated signal comprises the steps of:

applying an inverse Fast Fourier Transform to said data symbol vectors; and applying a cyclic prefix to said data symbol vectors to said data symbols.

27. A radio frequency transmitter providing reduced peak to average power ratio in a radio frequency signal, the transmitter comprising:

means for modulating a plurality of sub-carriers with a plurality of data symbol vectors to produce a first modulated signal;

means for limiting the magnitude of the first modulated signal to produce a first limited modulated signal;

means for demodulating the first limited modulated signal to recover the data symbol vectors;

means for predistorting the data symbol vectors to provide a minimum magnitude for in-phase and quadrature components thereof to produce predistorted data symbol vectors;

means for modulating the plurality of carriers with the predistorted data symbol vectors to produce a second modulated signal;

means for limiting the magnitude said second modulated signal to produce a second limited modulated signal;

means for reducing intermodulation products in said second limited modulated signal.

28. A radio frequency transmitter providing reduced peak to average power ratio in a radio frequency signal, the transmitter comprising:

means for modulating a plurality of sub-carriers with a plurality of data symbol vectors to produce a first modulated signal, a first group of said subcarriers lying in upper and lower sidebands of a radio channel, and a second group of said subcarriers lying in a central band of said radio channel;

means for means for limiting the magnitude of the first modulated signal to produce a first limited modulated signal;

means for removing intermodulation products in said first limited modulated signal;

means for demodulating the first limited modulated signal to recover the constellation points;

means for predistorting the data symbol vectors on said first and second group of subcarriers to provide a minimum magnitude for in-phase and quadrature components thereof to produce predistorted data symbol vectors;

means for modulating the plurality of carriers with the predistorted data symbol vectors to produce a second modulated signal;

means for limiting the magnitude said second modulated signal to produce a second limited modulated signal;

means for removing intermodulation products in said second limited modulated signal; and means for predistorting the data symbol vectors on said second group of subcarriers to provide a minimum magnitude for in-phase and quadrature components thereof to produce additional predistorted data symbol vectors.

* * * * *